Oct. 31, 1939.        E. D. HARBOUR        2,178,038
RIMLESS SPECTACLE MOUNTING
Filed June 30, 1937

Ernest D. Harbour
INVENTOR
BY Victor J. Evans & Co.
ATTORNEYS

Patented Oct. 31, 1939

2,178,038

UNITED STATES PATENT OFFICE 2,178,038

RIMLESS SPECTACLE MOUNTING

Ernest D. Harbour, Roanoke Rapids, N. C.

Application June 30, 1937, Serial No. 151,271

2 Claims. (Cl. 88—47)

This invention relates to spectacle mountings and has for the primary object the provision of a device of this character which possesses all the advantages of rimless spectacles as now constructed and used with additional advantages, consisting of a more efficient and durable connecting means between the lenses to prevent relative movement of the lenses, either when worn or when being handled, and being so located with respect to said lenses and the eyes of the wearer that it will be out of the normal range of vision of the person.

Another object of this invention is the provision of temple bar attaching means for connecting temple bars onto the lens connecting means which will position the temple bars entirely rearwardly of the eyes and with the major portions of said temple bars in a plane with the horizontal meridian of the eyes and said attaching means being located so as not to obstruct the side vision of the wearer.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a rear elevation illustrating a spectacle mounting and lenses carried thereby and constructed in accordance with my invention.

Figure 5:
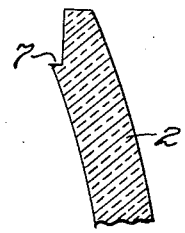
Figure 5 is a sectional view taken on the line 5—5 of Figure 4.

Referring in detail to the drawing, the numeral 1 indicates a bar for connecting lenses 2 to prevent said lenses from having relative movement and includes lens attaching portions 3 each including spaced flexible strip-like portions 4 and 5 spaced from each other to receive therebetween the upper edge of the lens. Connecting the strip-like portions 4 and 5 are fasteners 6 in the form of screws having threaded connection with the strip-like portions 4. The fasteners 6 extend through openings provided in the lenses, said openings being located adjacent the upper edges of the lenses. The lenses at their upper edges are cut away, as shown in Figure 5, to form shoulders or seats 7 engaged by the strip-like portions 5 and which cooperate with the fasteners 6 in firmly anchoring the lenses onto the bar 1 to prevent relative movement of the lenses or the rocking of said lenses upon said fasteners.

Nose engaging means 8 of any selected or well known construction is secured on the bar 1 between the lenses.

Integral with the ends of the bar 1 are temple bar attaching arms 9 which extend rearwardly of said bar and lenses and are curved to position the free ends thereof rearwardly of the eyes of the wearer and in a plane substantially with the horizontal meridian of the eyes, while the major portions of said arms are located above the horizontal meridian of the eyes so as not to obstruct side vision. Hinged to the free ends of the arms 9 are temple bars 10 of any well known construction. Thus it will be seen that the temple bars 10 are located entirely rearwardly of the eyes of the wearer and due to the curvature of the arms 9 will permit positioning of the major portions of said temple bars in a plane of the horizontal meridian of the eyes. The major portions of the temple bars being thus located with respect to the eyes will permit the major portions of the temple bars extending from the ears towards the eyes to be arranged horizontally and in alignment with the horizontal meridian of the eyes thereby more effectively retaining the lenses in proper position with respect to the eyes than by the practice of attaching the temple bars onto the lenses in a plane above the horizontal meridian of the eyes. The mounting thus described will permit the wearer of the glasses to have normal unobstructed vision, the bar 1 being so located above the normal vision of the wearer that it will not be seen. Also the curvature of the arms 9 permits unobstructed side vision by the wearer of the spectacles.

Figure 1:
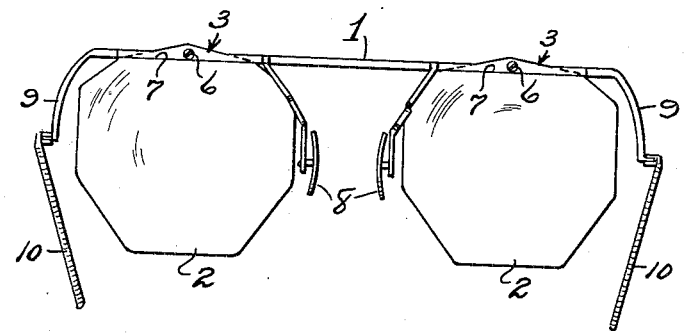
Figure 2:
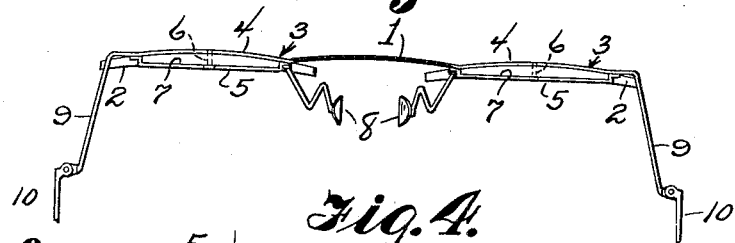
Figure 2 is a fragmentary top plan view illustrating the same.
Figure 3:
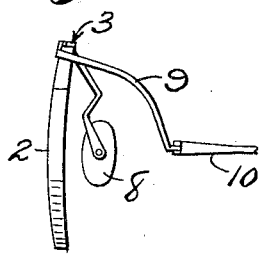
Figure 3 is a fragmentary side elevation, partly in section, illustrating the temple bar attaching means for connecting the temple bar onto the lens connecting means.
Figure 4:
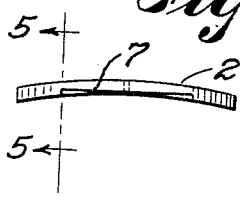
Figure 4 is an edge view illustrating a seat formed in a lens to be engaged by the lens connecting means.
Figure 6:
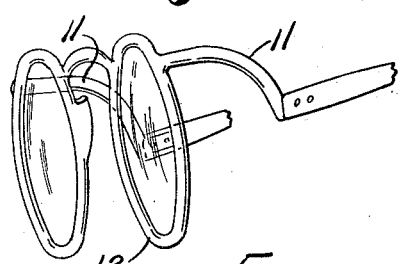
Figure 6 is a fragmentary perspective view illustrating a modified form of my invention.

Referring to Figure 6 it will be seen that curved arms 11 corresponding to the arms 9 may be formed on rimmed spectacles 12 and have the temple bars hinged thereto so that rimmed spectacles can have the same advantage as the type of mounting shown in Figures 1 and 2 without employing the bar 1, that is, the positioning of the temple bars entirely rearwardly of the eyes of the wearer and in a plane with the horizontal meridian of the eyes.

What is claimed is:

1. Spectacles comprising lenses and an integral lens supporting and bridge bar, the middle portion of the bar constituting the bridge proper and the opposite portions outward from the bridge portion constituting the lens supports, said supports each including a definite length of the bar proper conformed to fit the contour of the adjacent outer face of the top marginal portion of the lens and a cooperative, spaced, substantially parallel strip secured at its opposite end portions to the inner side of said lens engaging portion of the bar, the adjacent inner face of the marginal portion of the lens inserted between said supporting portions being recessed to provide a horizontal shoulder for engagement by the lower edge portion of said strip, a transverse screw element inserted through registered apertures in one of the supporting members of the bar and the interposed lens portion and threaded into an opening in the companion supporting member of the bar whereby to securely hold the lens immovable in its mounting, the end portions of said bar being first bent rearwardly approximately at right angles thereto and extending therefrom in substantially a horizontal plane to points rearward of the lateral range of vision of the wearer, thence roundingly downward and rearward and terminating in a plane coinciding with the horizontal meridian of the eyes, and temple bars extended rearwardly from the ends of the lens supporting and bridge bar in the said coinciding horizontal plane.

2. Spectacles comprising lenses, an integral bar extending in a straightwise horizontal direction, the middle portion of the bar constituting the bridge proper of the mounting, the opposite portions next adjacent and outward from the bridge portion being conformed throughout a definite length to fit the contour of the outer face of the top marginal portions of the lenses, and spaced parallel strips secured at their ends to the inner side of the bar to provide longitudinal openings for the reception of the top marginal portions of the lenses, said marginal portions being recessed on the inner sides of the lenses to provide shoulders for the engagement of the lower marginal portions of said strips, and transverse screw elements inserted through registered apertures in said strips and marginal portions of the lenses and threaded into apertures provided therefor in the companion outer lens supporting portions of the bar, the extreme end portions of the bar having provision for the attachment of temple bars thereto.

ERNEST D. HARBOUR.